INVENTORS
G.T.R. CAMPBELL
N.V. LASKEY

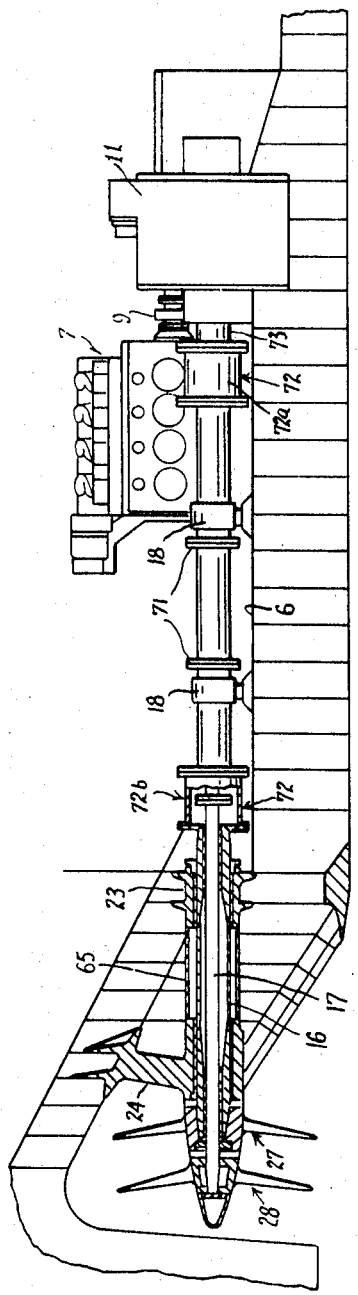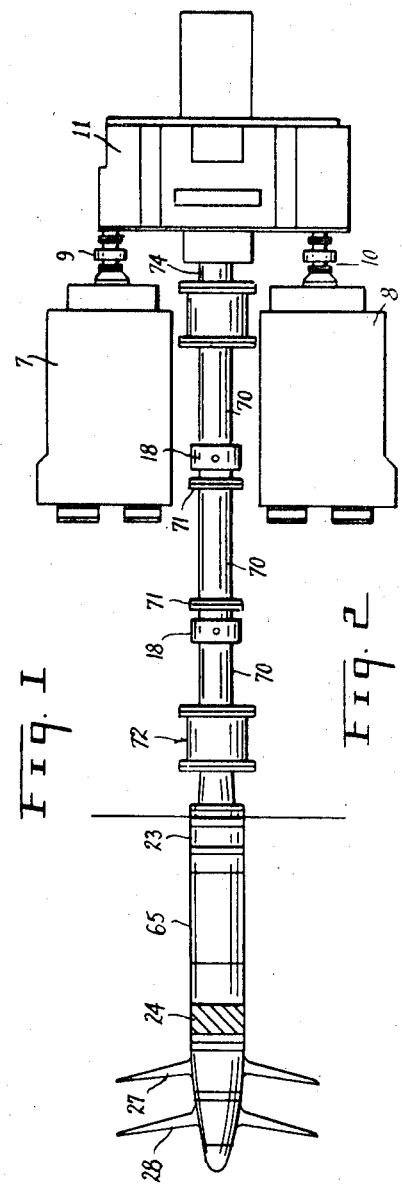

Fetherstonhaugh & Co.
ATTORNEYS

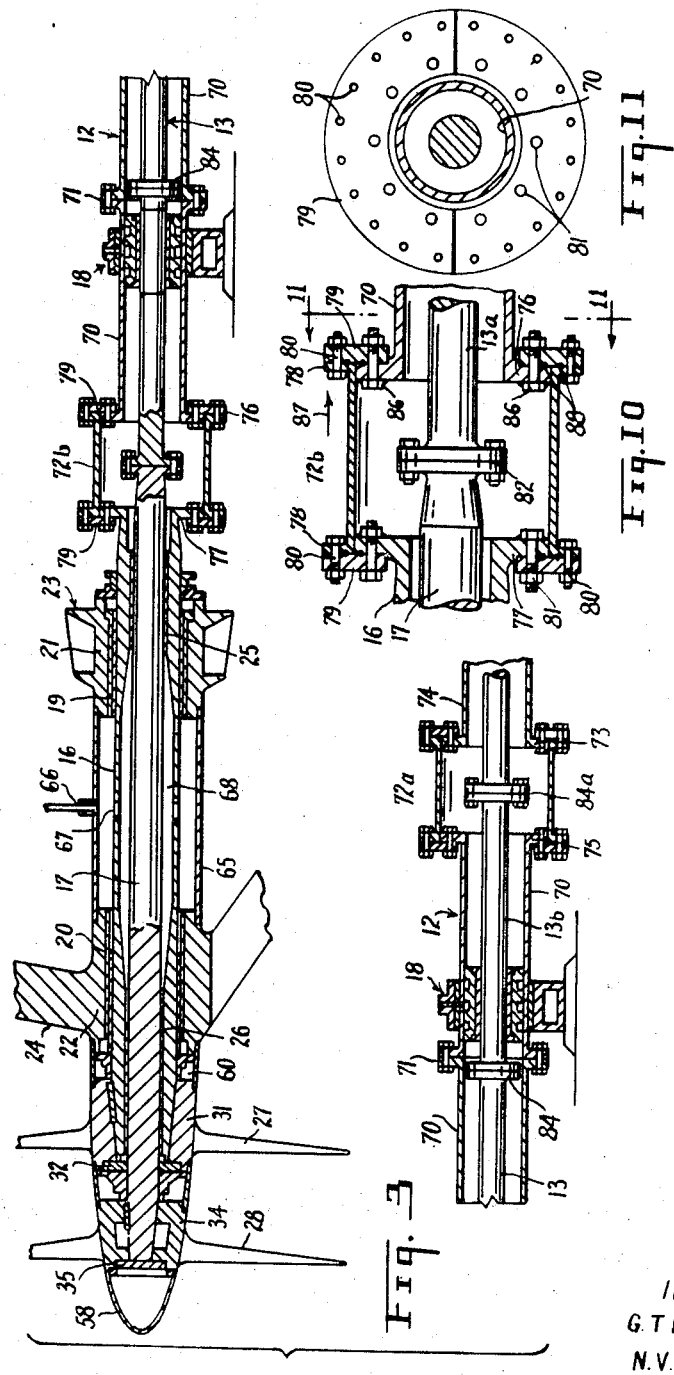

Sept. 30, 1969  G. T. R. CAMPBELL ET AL  3,469,556
CONTRA-ROTATING PROPELLER DRIVE FOR SURFACE
AND SUBMARINE VESSELS
Filed Feb. 6, 1968  5 Sheets-Sheet 5

INVENTORS
G.T.R. CAMPBELL
N.V. LASKEY

Fetherstonhaugh & Co.
ATTORNEYS

United States Patent Office 3,469,556
Patented Sept. 30, 1969

3,469,556
CONTRA-ROTATING PROPELLER DRIVE FOR SURFACE AND SUBMARINE VESSELS
George T. R. Campbell and Norman V. Laskey, Montreal, Quebec, Canada, assignors, by mesne assignments, to Algoship International Limited, Nassau, Bahamas, a corporation of the Bahamas
Filed Feb. 6, 1968, Ser. No. 703,323
Int. Cl. B63h 5/10, 1/14
U.S. Cl. 115—34           13 Claims

ABSTRACT OF THE DISCLOSURE

Two concentrically oriented tail shafts are arranged so that contra-rotating propellers can be secured, one on the tapered outer end of each tail shaft, with rotary shaft seals on each tail shaft to prevent the ingress of sea water to the bearings supporting the tail shafts. Reversible collars and associated rubber and jacking rings, backed by grease under pressure are used, in one position, to force the propellers on to the tapered ends of their respective tail shafts and, when reversed, will force the propellers off their tail shafts. Single or multiple prime movers are connected, through suitable reduction gearing, to concentric power shafts which, in turn are connected to the concentric tail shafts.

The invention relates to the propulsion of surface and submarine vessels and particularly to the power drive for such vessels using contra-rotating propellers.

Contra-rotating propellers for vessels have not found favour in the past, due entirely to the mechanical complexity of the arrangement which involves shaft seals and the securing of two propellers on two tail shafts which have to be concentrically oriented and, of course, the drive from the prime mover to the tail shafts.

The present invention is related to ways and means by which the engineering problems referred to above can be overcome in a relatively simple and inexpensive manner.

The invention consists essentially of a pair of tail shafts concentrically oriented and supported in forward and aft bearings in a stern tube, each tail shaft projects rearwardly from the stern tube with the axial shaft projecting rearwardly beyond the outer end of the outer concentric shaft. Each tail shaft has a tapered after end on which is fitted a propeller. One rotary oil seal is fitted about the outer concentric tail shaft in the space between the after end of the stern tube and the forward propeller, and a second rotary oil seal is fitted about the axial tail shaft in the space between the forward and after propellers.

Each tail shaft is rotated by concentric intermediate shafts connected to individual reduction gear units located within a single gear case, the individual reduction gear units being separately driven a prime mover.

The invention is further characterized in that the propellers are secured in place on the tapered ends of their respective tail shafts and are removed therefrom by means of grease under pressure applied through reversible securing and jacking collars.

The invention is still further characterized in that novel means are provided whereby intermediate portions of the drive shafts are readily removed for the purpose of withdrawing the tail shafts from the stern tube, inwardly of the vessel, and includes a compound bearing assembly for supporting both the axial and concentric intermediate drive shafts.

A prime object of the present invention is to obtain a torque balance in the propulsion elements of a vessel using contra-rotating propellers, resulting in better stability in rotation of the tail shafts.

A further object of the invention is to provide a higher loading for a given disc area of contra-rotating propellers, with resulting smaller optimum diameter and lower loading per blade.

A further object of the invention is to provide means for the recovery of rotational energy normally lost in the slip stream together with an increase in the propulsive coefficient of the vessel, i.e.:

$$\text{Propulsive coefficient} = \frac{\text{Effective horsepower}}{\text{Developed horsepower}}$$

A further object of the invention is to provide for lighter weight concentric shafting between the prime movers and the contra-rotating propellers.

A further object of the invention is to provide novel means for securing and jacking-off the contra-rotating propellers from their tail shafts thereby eliminating the use of threaded ends to the tail shafts and heavy securing nuts.

A further object of the invention is to provide effective sealing means between the outer ends of the concentric tail shafts and the adjacent outer end of the stern tube of the vessel.

A further object of the invention is to provide individual drives through reduction gearing to the concentric shafts driving the contra-rotating propellers.

A further object of the invention is to provide reduction gear drives for the contra-rotating propellers which will permit the transmission of increased power to the propellers while taking up a minimum of space in the engine room of the vessel.

A further object of the invention is to provide composite shaft bearings for adequate support of the concentric shafts driving the contra-rotating propellers.

These and other objects of the invention will be apparent from the following detailed specification and the accompanying drawings in which;

FIG. 1 is a partial longitudinal section of the after end of a vessel showing the installation of the drive to contra-rotating propellers according to the present invention.

FIG. 2 is a plan view of the installation shown in FIG. 1.

FIG. 3 is an enlarged vertical sectional view of the after end of the drive to the contra-rotating propellers shown in FIG. 1.

FIG. 10, Sheet 2, is an enlarged sectional view one of the removable torque tubes and driving flanges of the outer concentric drive shaft.

FIG. 11 is a vertical section taken on the line 11—11 of FIG. 10.

Figure 12:
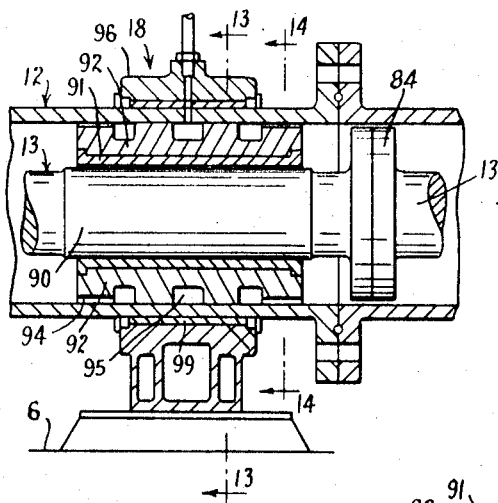

FIG. 12 is an enlarged partial longitudinal section of one of the composite shaft bearings.

Figure 13:
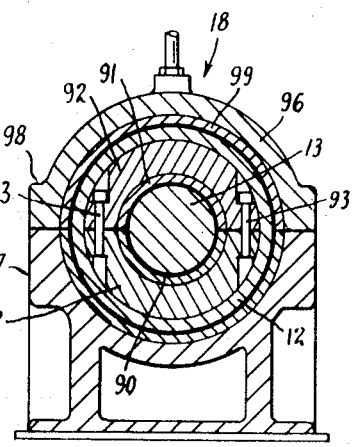

FIG. 13 is a vertical transverse section of the composite bearing taken on the line 13—13 of FIG. 12.

Figure 14:
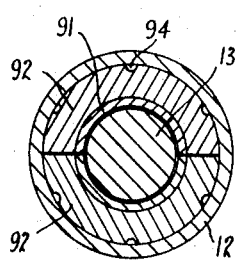

FIG. 14 is a vertical transverse section of the composite bearing taken on the line 14—14 of FIG. 12.

Figure 15:
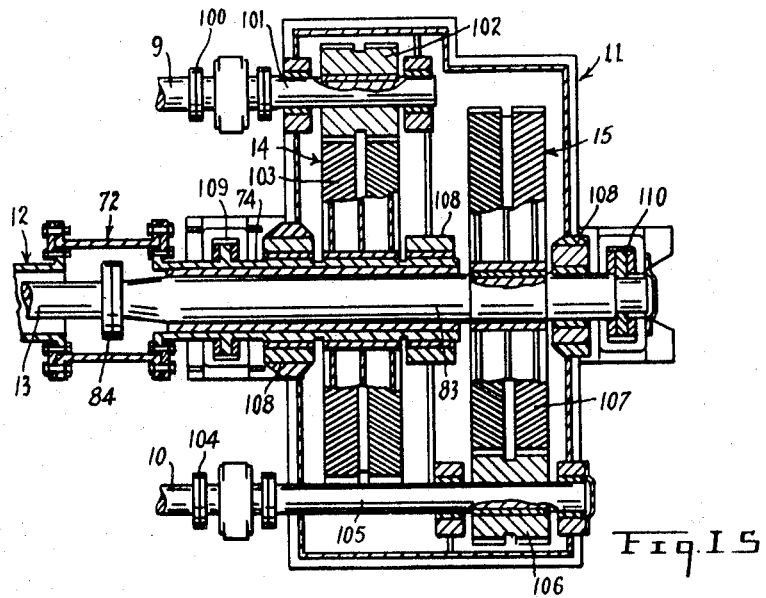

FIG. 15 is an enlarged sectional plan view of the reduction gear case shown in FIGS. 1 and 2 and showing the individual drives from the two prime movers to the concentric drive shafts.

Figure 16:
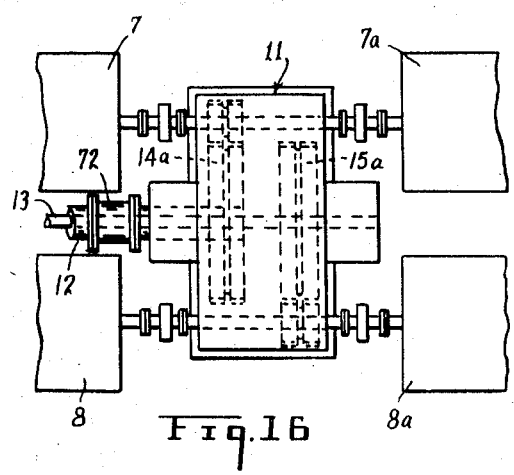

FIG. 16 is an outline plan view showing an arrangement similar to FIG. 15 but showing two prime movers connected to each reduction gear.

Referring to the drawings and particularly to FIGS. 1 and 2, there is illustrated the lower after section of the vessel including the tank top 6 on which are mounted two power units 7 and 8. The power unit 7 has a power output connection 9 and the power unit 8 has a power output connection 10, both power output connections being connected to the input side of the reduction gear casing 11 within which is supported two separate gear reduction units driven respectively by the power output connections 9 and 10.

A pair of concentric drive shafts 12 and 13 are drivably connected at their forward ends, the outer concentric shaft 12 to the gear reduction unit 14 and the axial shaft 13 to the gear reduction unit 15 (see FIG. 15), and at their after ends to the concentric tail shaft 16 and the axial tail shaft 17 respectively.

The drive shafts 12 and 13 are supported throughout their length in the composite bearings 18 mounted on the tank top 6.

The hollow concentric tail shaft 16 is supported in forward and after outer bearings 19 and 20 respectively which, in turn, are mounted in bearing bosses 21 and 22 in the forward and after stern castings 23 and 24 secured in the stern structure of the hull of the vessel.

The axial tail shaft 17 is supported in forward and after inner bearings 25 and 26 respectively which, in turn, are supported within the hollow tail shaft 16.

Contra-rotating propellers 27 and 28 are secured on the tapered ends 29 and 30 of the tail shafts 16 and 17 respectively.

Referring now more particularly to FIGS. 3 to 7 inclusive, the forward propeller 27 has a boss 31 secured on the tapered end 29 of the tail shaft 16 by the collar 32 and is held against rotation thereon by the key 33, while the after propeller 28 has a boss 34 secured on the tapered end 30 of the tail shaft 17 by the collar 35 and is held against rotation thereon by the key 36.

In FIGS. 4 to 9 there is shown a novel method for securing and jacking-on and jacking-off the propellers 27 and 28. The collars 32 and 35 are reversible and in one position (FIG. 4) are used to jack the propellers on to the tapered ends 29 and 30 of their respective tail shafts 16 and 17.

The collar 32 is annular and is located about the tail shaft 17 and is secured to the adjacent end surface of the tail shaft 16 by the cap screws 37. The collar 32 is provided with an annular recess 38 within which is fitted a pressure ring 39 backed by an elastomer sealing ring 40. An annular passage 41 in communication with the recess 38, has a pair of grease gun connections 42, permitting grease to be pumped under pressure of about 1,000 p.s.i. into the recess 38 and against the rings 40 and 39 to force the sealing ring 39 in the direction of the arrows 43 against the adjacent surface of the propeller boss 31, forcing the propeller 27 into an interference fit on the taperd end 29 of the tail shaft 16. A series of laminated shims 44 are fitted between the collar 32 and the adjacent surface of the tapered end 29 of the tail shaft 16 to permit axial adjustment of the collar 32 as the propeller 27 moves up on the tail shaft after repeated removals and reinstallation of the propeller in service.

Similarly, the collar 35, which in this case is a flat disc, is secured to the adjacent end surface of the tail shaft 17 by the cap screws 45. The collar 35 is fitted with a pressure ring 39a backed by an elastomeric sealing ring 40a and is provided with an annular passage 41 in communication with the recess 38 in the same manner as described above in connection with the collar 32, and grease under pressure acts against the rings 40a and 39a to force the propeller 28 into an interference fit on the tapered end 30 of the tail shaft 17. A series of laminated shims 46 are fitted between the collar 35 and the adjacent surface of the tapered end 30 of the tail shaft 17 to permit axial adjustment of the collar 35 as the propeller 28 moves up on the tail shaft after repeated removals and reinstallations of the propeller in service.

Figures 5, 6:
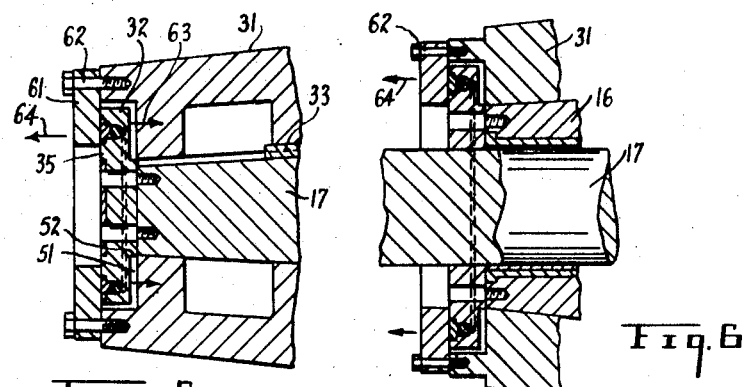
FIG. 5 is a partial sectional view taken from FIG. 4 showing the propeller securing collar in reversed position for jacking-off the after propeller from its tail shaft.
FIG. 6 is a sectional view similar to FIG. 5 but showing the propeller securing collar in reversed position for jacking-off the forward propeller from its tail shaft.
Figures 8, 9:
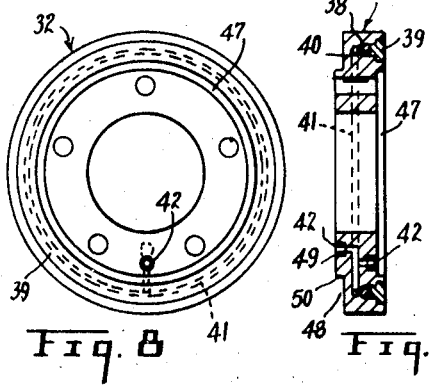
FIG. 8 is a front elevational view of one of the propeller securing collars.
FIG. 9 is a vertical section of the securing collar taken on the line 9—9 of FIG. 8.

As will be seen in FIGS. 8 and 9 the collar 32, and also the collar 35, is provided with an annular recess 47 on the face in which the pressure ring 39 is mounted, and has an annular peripheral recess 48 on the opposite face. The recess 47 has an outer diameter equal to that of the adjacent end of the taper on the tail shaft 16. The similar recess in the collar 35 has a diameter equal to the diameter of the end of the taper of the tail shaft 17. The recess 48 on the opposite side of the collar 32 forms a boss 49 whose peripheral edge 50 is such that when the collar is reversed for jacking-off the propeller, the boss 49 will bear against the adjacent surface of the tapered end 29 of the tail shaft 16, as shown in FIG. 6. Similarly, the collar 35 is recessed at 51 to form a boss 52 as shown in FIG. 5.

Figure 4:
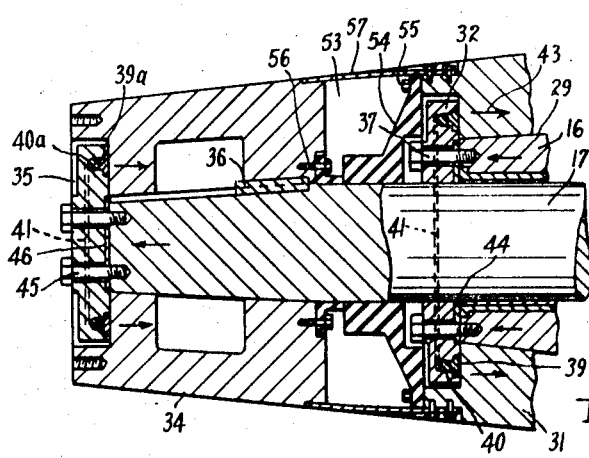
FIG. 4 is an enlarged sectional view of the after portion of the concentric tail shafts showing in detail the installation of the propeller securing collars and the after rotary shaft seal between the hubs of the two propellers.

It will be noted in FIGS. 3 and 4 that the tapered end 30 of the tail shaft 17 is located further aft than the tapered end 29 of the tail shaft 16. This leaves a space 53 for the installation of the rotary shaft seal 54 about the tail shaft 17. This seal 54 is a two-part seal having one part thereof secured at its forward outer peripheral edge to the adjacent face of the propeller boss 31 by the cap screws 55 and having the other part thereof secured at its after end to the adjacent face of the propeller boss 34 by the cap screws 56. The space 53 between the propeller bosses 31 and 34 is closed off when the vessel is in service by the rope guard 57. The after end of the propeller boss 34 is closed off by the propeller cone 58.

A rotary shaft seal 59, similar to the seal 54, seals the space 60 between the after face of the boss 22 on the stern casting 24 and the forward face of the boss 31 of the propeller 27, and is secured in a manner similar to that shown in FIG. 4 in connection with the seal 54.

When it is desired to jack-off the propellers 27 and 28 from their respective tail shafts 16 and 17, the propeller 28 is first removed in the following manner. The cap screws 44 are first removed and the collar 35 is reversed from the position shown in FIG. 4 to the position shown in FIG. 5. A portable reverse thrust ring 61 is then secured to the after face of the propeller boss 34 by the cap screws 62. In this position the thrust ring 61 overlaps the collar 35 and pressure ring 40a.

Figure 7:
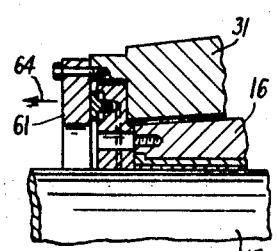
FIG. 7 is a partial sectional view taken from FIG. 6 but showing the boss of the after propeller partially removed from its tail shaft by the jacking-off collar.

When grease under pressure of about 1,000 p.s.i. is introduced into the annular passage 41 the pressure ring 40a is forced against the fixed thrust ring 61 and the reaction forces in the direction of the arrows 63 cause the propeller boss 34 to move in the direction of the arrow 64 as clearly seen in FIG. 7 and so loosen the propeller 28 from its tail shaft.

Once the propeller 28 has been removed, a similar operation can be applied to the propeller 27 after the seal 54 has been removed. The operation is as follows: The cap screws 37 are removed, the collar 32 is reversed and a portable reverse thrust ring 61 is secured to the after face of the propeller boss 31 as shown in FIG. 6. Pressure applied behind the pressure ring 39, in the manner described above, will force the thrust ring 61 out wards in the direction of the arrow 64 and will carry the propeller 27 with it. The slight axial movement of the propeller boss of its tapered tail shaft is sufficient to permit the propellers to be lifted clear of the tail shafts by conventional derrick means.

As an example of the geometry of the propeller securing and jacking-off collar above described, the forward propeller 27 will be forced on to the tapered end of the tail shaft 16 by an axial load of 45 tons when the rubber seal ring 40 is compressed by grease from a hand operated grease gun at a pressure of 1,000 p.s.i. This will ensure an interference fit as good as can be achieved by "flogging up" on a nut as with a conventional tail shaft having a threaded end. Using four 1.5 inch dia. high tensile steel cap screws to hold the securing and jacking collar 32 to the end of the tail shaft 16, the bolts will be subjected to a tensile stress of 5 tons p.s.i. during the jacking-on operation. As these bolts 37 can, with safety, be subjected during the jacking-on operation to a tensile stress of 10 tons p.s.i., the packing load will be increased to 90 tons by boosting the grease gun pump pressure to 2,000 p.s.i. and, thus the degree of friction or interference fit, which is greatest between the propeller and the tapered end of the tail shaft is greatly increased and, as a consequence, the size of the key 33 used to prevent rotation of the propeller on the tapered end of the tail shaft can be reduced in width, depth and length.

The reverse thrust ring 61 associated with the securing collar 32 is secured to the hub 31 by say twelve one-inch diameter, high-tensile bolts 62. The stress in them will be 9.54 tons per square inch, when the propeller is jacked off the taper on the assumption that the load applied to jack it on to the taper in the first instance is 90 tons.

In the securing and jacking of the after propeller 28, a grease pressure of 1,500 p.s.i. will induce a load of 45 tons to force the propeller on to the taper of the tail shaft 17. As stated above, the jacking load can be increased to 90 tons by increasing the grease pressure which, in this case, will have to be 3,000 p.s.i. The cap screws 44 and 62 are scantlinged to be strong enough to withstand this load of 90 tons and the stress in them will not exceed 10 tons per square inch.

That portion of the tail shaft assembly between the stern castings 23 and 24, is closed in by the stern tube 65 and lubricating oil is fed into the stern tube from a reservoir, not shown, through the connection 66. An aperture or apertures 67 in the wall of the hollow tail shaft 16 permits oil to flow into the annular space 68 between the tail shafts 16 and 17. The oil in the stern tube 65 and in the space between the tail shafts will readily flow to lubricate the bearings 19, 20, 25 and 26.

For convenience of assembly the outer drive shaft 12 is made in suitable lengths, as is also the axial drive shaft 13.

Referring to FIGS. 1, 2, 3, 10 and 11. The outer drive shaft 12 comprises three, or any convenient number of tubular sections 70 each having flanged end coupled together at 71, and at least a pair of torque tubes 72, the forward torque tube 72a being coupled at its forward end to the flanged end 73 of the output drive connection 74 from the gear reduction unit 14 and at its rearward end to the flanged end 75 of the adjacent tubular section 70. The after torque tube 72b is coupled at its forward end to the flanged end 76 of the adjacent tubular section 70 and, at its after end is coupled directly to the flange 77 of the tail shaft 16.

The torque tubes 72 are shown in greater detail in FIGS. 10 and 11. The torque tube 72 here shown is for illustrative purposes the one connected to the tail shaft 16 as in FIG. 3. The torque tube 72 has a pair of end flanges 78 and fits about the periphery of the adjacent flange 76 of the tubular section 70 and the flange 77 of the tail shaft 16. Driving flanges 79 are split into two half sections 79a and 79b and are connected by an outer circle of bolts 80 to the flanges 78 of the torque tube 72 and by an inner circle of bolts 81 to the 76 and 77 respectively.

Each torque tube 72 is located about a coupling 82 joining the tail shaft 17 to an adjacent section 13a of the axial drive shaft 13, as in the case of the after torque tube 72b shown in FIG. 10, or between an adjacent section 13b of the axial drive shaft and the output shaft 83 of the gear reduction unit 15.

Intermediate couplings 84 joining sections of the axial drive shaft 13 are located adjacent the couplings 71 of the outer drive shaft 12.

The bolts 81, in both torque tube assemblies 72a and 72b, connecting the torque tube to the adjacent flanged end of the tubular section 70 as in 72b or to the adjacent flanged end of the drive connection 74, have their heads 86 tack welded to the flange 73 or 76 respectively, as shown in FIG. 10. Therefore, when the nuts of the bolts 80 and 81 are removed, the torque tubes can be moved axially in the direction of the arrow 87, to permit access to the coupling 82 for the purpose of inspection or uncoupling.

By means of the above described assembly the outer drive shaft 12 is a completely tubular section designed for maximum torque and its size can be kept to a minimum. Suitable O-rings 88 provide the necessary seal to prevent egress of oil from the space between the drive shafts 12 and 13.

The composite shaft bearings 18 will now be described in detail and referral is made to FIGS. 12, 13 and 14.

In the location of the bearings 18 the axial drive shaft 13 is provided with a bearing surface 90. A split bearing sleeve 91 is fitted about the bearing surface 90 and is held in place by the half blocks 92 which are secured together by the stud bolts 93. The outer peripheral surface of the half blocks 92 is a running fit on the inner surface of the outer drive shaft 12. The half blocks 92 are provided with suitable grooves 94 and 95 for lubricating purposes.

The drive shaft 12 is supported in the pedestal 96 consisting of a lower portion 97 which is secured to the tank top 6 in usual manner, and an upper portion 98 and has a split bearing sleeve 99 bearing on the outer surface of the outer drive shaft 12.

Referring now more particularly to the drive for the contra-rotating propellers 27 and 28 and particularly to FIGS. 1, 2, 3 and 15. The power output shaft 9 from the power unit 7 is directly connected to the reduction gear unit 14 through the coupling 100 and input shaft 101 carries the spur gear 102. The main gear 103 of the reduction gearing 14 drives the hollow output shaft 74 which, in turn is coupled to the torque 72a in the outer drive shaft assembly 12. The coupling 100 is of simple detuning type to avoid the incidence of torsional stress in the crank shaft of the power unit 7.

The power output shaft 10 from the power unit 8 is directly connected to the reduction gear unit 15 through the simple detuning coupling 104 and input shaft 105 carries the spur gear 106. The main gear 107 of the reduction gearing 15 drives the axial output shaft 83 which, in turn is coupled at 84a to the propeller drive shaft 13. Suitable bearings 108 support the concentric shafts 74 and 83 in the unitary gear casing 11. In addition, the output shaft 74 is provided with a thrust bearing 109 while the output shaft 83 is provided with a thrust bearing 110.

In FIG. 16 there is shown a power input to the gear reduction units 14a and 15a in which twin power units 7 and 7a are drivably connected to the reduction gear unit 14a, and twin power units 8 and 8a are drivably connected to the reduction gear unit 15a.

From the above description it will be obvious that contra-rotating propellers can be used on all classes of vessels and will be admirably suited for application to large tankers and bulk carriers. These vessels have increased in size so rapidly that, with the large amount of power required to propel them, further deployment of a single propeller appears to be impractical. However, the adoption of twin-screws for such large vessels presents problems, as a vessel with twin screws is hydrodynamically inferior to one propelled by a single screw and, further, a twin screw vessel is more expensive to build and maintain than its single screw-counterpart.

By using contra-rotating propellers as herein set forth, each propeller and its associated shafting only handles half the total power required to propel the vessel and, as such, the physical size of the outer hollow shaft will not reach unmanageable proportions.

The necessity to interpose fluid couplings between each engine and the primary pinion shaft of the gear box it drives is not necessary, as is the case when twin diesel engines are arranged to drive a single propeller through single-reduction gearing. It should be noted that, in the herein described arrangement, each diesel engine will drive a completely separate single reduction gear train in the gear box which, in turn, drives one of the two contra-rotating propellers quite independently of the other. Therefore, it is only necessary to provide a simple de-tuning type of coupling to avoid the incidence of dangerous torsional vibrational stress of a high order of magnitude from being induced in the crank shaft of the engine.

With concentric drive shafts it is essential that the axial drive shaft be inspected at intervals, particularly in the way of the couplings. With the arrangement of torque tubes at the forward and after ends of the outer drive shaft 12, rapid axial movement of the torque tubes can be effected for inspection of the axial shaft 13. Furthermore, whole or partial dismantling of the shaft assembly can be effected should it be necessary to withdraw inwardly of the vessel either one or both of the tail shafts 16 and 17.

What we claim is:

1. Contra-rotating propellers and drive for vessels comprising, a stern tube in the rearward portion of the hull of the vessel, a pair of concentric tail shafts mounted for rotation one about the other in said stern tube, each of said tail shafts having a tapered propeller receiving end portion located outwardly of the aft end of said stern tube, the inner of said concentric tail shafts projecting rearwardly of the outer concentric tail shaft, a propeller mounted on the tapered end of each of said tail shafts for rotation therewith, means to secure said propellers on their respective tail shafts, said latter means including a pair of reversible thrust collars secured to adjacent end faces of the tapered ends of the tail shafts, a pressure ring on each collar, and means to apply pressure against said pressure ring in one position of the reversible thrust collars to force the propellers onto the tapered ends of the tail shafts and in the reverse position of the collars to force the propellers off the tapered ends of the tail shafts, a pair of power drive units each including a reduction gear unit, an output drive connection from each of said reduction gear units, said output drive connections being concentric with each other, and intermediate concentric drive shafts between said concentric output drive connections and said concentric tail shafts for driving said propellers in contra-direction to each other.

2. Contra-rotating propellers and drive as defined in claim 1 in which the said intermediate drive shafts between the output drive connections from the reduction gear units and the tail shafts include a solid axial shaft and a hollow outer shaft concentric with the axial shaft, the said intermediate drive shafts being formed of sections coupled together, the couplings of the said hollow outer shaft comprising torque tubes movable axially on the hollow outer shaft to expose the couplings of the solid axial shaft.

3. Contra-rotating propellers and drive as defined in claim 2 in which at least two of said torque couplings couple the drive shaft at one end to the outer output drive connection from a reduction gear unit and at the opposite end to the outer concentric tail shaft.

4. Contra-rotating propellers and drive as defined in claim 3 in which the outer of said output drive connections has a terminal flange and the outer concentric tail shaft has a terminal flange, and the said outer concentric drive shaft has end flanges, and the opposing end flanges are spaced apart from each other, the said torque tubes are located about the periphery of the said opposing end flanges and split driving flanges connect the said end flanges with adjacent end flanges of the torque tubes.

5. Contra-rotating propellers and drive as defined in claim 3 in which oil-seal rings are interposed between the said split drive flanges and the adjacent facing flanges of the drive shaft, output drive from the one reduction gear and outer concentric tail shaft.

6. Contra-rotating propellers and drive as defined in claim 1 in which the said reduction gear units are spaced longitudinally apart from each other and have input drives to the reduction gear units located in a horizontal plane diametrically opposite from each other from the common axis of the output drive from the reduction gear units.

7. Contra-rotating propellers and drive as defined in claim 1 in which the reversible thrust collars in one position are secured to the adjacent rear face of their respective tail shafts and the pressure ring in each collar is adapted to exert pressure against an adjacent face of the propeller to force the propeller onto its shaft, and in the reverse position of the thrust collars a thrust ring is secured to the adjacent end surface of the propellers and the pressure ring bears against the said thrust ring to force the propellers off their respective tail shafts.

8. Contra-rotating propellers and drive as defined in claim 1 in which the means to apply pressure against said pressure ring includes an annular passage connected to a source of pressure and a flexible seal ring is interposed between the said pressure ring and the said annular passage.

9. Contra-rotating propellers and drive as defined in claim 1 in which each of the said thrust collars is recessed in one face and has a corresponding raised boss on its opposite side, the diameter of the said recess being only slightly greater than that of the diameter of the end of the tail shaft, and the diameter of the raised face being slightly less than the diameter of the adjacent end of the propeller, and shims are accommodated in the recess to take up axial adjustment of the propeller on its tail shaft.

10. In marine propulsion, the combination of a rotatable tail shaft having a tapered propeller receiving end portion with an end face, power drive means for said shaft, a propeller mounted on said tapered end portion of the shaft, and means for selectively securing the propeller to the shaft and removing the propeller, said securing and removing means comprising a reversible thrust collar secured to said end face of the shaft, a pressure ring on said collar, and means for applying pressure against said pressure ring in one position of the reversible thrust collar to force the propeller onto the tapered end portion of said shaft and in the reverse position of the collar to force the propeller off the tapered end portion of the shaft.

11. The combination as defined in claim 10 wherein the reversible thrust collar in one position is secured to said end face of the shaft and said pressure ring is adapted to exert pressure against an adjacent face of the propeller to force the propeller onto the shaft, and in the reverse position of the thrust collar a thrust ring is secured to an adjacent end surface of the propeller and said pressure ring bears against said thrust ring to force the propeller off the shaft.

12. The combination as defined in claim 10 wherein said means for applying pressure against said pressure ring include an annular passage connected to a source of pressure and a flexible seal ring interposed between said pressure ring and said annular passage.

13. The combination as defined in claim 10 wherein said thrust collar is recessed in one face and has a corresponding raised boss on its opposite face, the diameter of said recess being only slightly greater than that of the end of said tail shaft, the diameter of the raised boss being slightly less than that of the adjacent end of the propeller, and shims accommodated in the recess to take up axial adjustment of the propeller on the tail shaft.

References Cited

UNITED STATES PATENTS 1,853,694  4/1932  Melcher.

FOREIGN PATENTS 1,499,497  9/1967  France.
1,501,097  10/1967  France.

TRYGVE M. BLIX, Primary Examiner

U.S. Cl. X.R.

170—135.28